United States Patent
Saquib et al.

(10) Patent No.: US 7,808,674 B2
(45) Date of Patent: Oct. 5, 2010

(54) IMAGE STITCHING FOR A MULTI-HEAD PRINTER

(75) Inventors: Suhail S. Saquib, Shrewsbury, MA (US); William T. Vetterling, Lexington, MA (US)

(73) Assignee: Zink Imaging, Inc., Bedford, MA (US)

( * ) Notice: Subject to any disclaimer, the term of this patent is extended or adjusted under 35 U.S.C. 154(b) by 309 days.

(21) Appl. No.: 12/128,507

(22) Filed: May 28, 2008

(65) Prior Publication Data
US 2008/0225308 A1    Sep. 18, 2008

Related U.S. Application Data

(62) Division of application No. 10/374,847, filed on Feb. 25, 2003, now Pat. No. 7,388,686.

(51) Int. Cl.
*G06F 15/00* (2006.01)
*H04N 1/00* (2006.01)

(52) U.S. Cl. .......................... 358/1.8; 358/1.4

(58) Field of Classification Search ............... 358/1.1, 358/1.2, 1.4, 1.8, 3.1, 3.12, 3.2, 3.27; 347/8, 347/9, 12, 19, 37, 42, 47, 116, 117
See application file for complete search history.

(56) References Cited

U.S. PATENT DOCUMENTS

| | | | |
|---|---|---|---|
| 29,168 A | 7/1860 | Hernengwaris | |
| 2,417,897 A | 3/1947 | Adams et al. | |
| 2,995,465 A | 8/1959 | Riche, Jr. | |
| 2,967,784 A | 1/1961 | Newman et al. | |

(Continued)

FOREIGN PATENT DOCUMENTS

EP    0 774 857 A1    5/1997

(Continued)

OTHER PUBLICATIONS

English translation of Unexamined Patent Application Publication (Kokai) (A) S59-194886; Publication Date: Nov. 5, 1984; JPO File No. 6906-2H; Patent Application No. S58-69700; Filing Date: Apr. 20, 1983; Applicant: Ricoh Corporation.

(Continued)

*Primary Examiner*—Gabriel I Garcia
(74) *Attorney, Agent, or Firm*—Foley & Lardner LLP; James F. Ewing; Michel Morency

(57) ABSTRACT

Techniques are disclosed for stitching images printed by a multi-head printer in a manner that is relatively insensitive to misregistration of the image segments. When a pair of overlapping print heads print a pair of adjacent image segments which meet in a stitching region, printing at each location in the stitching region is accomplished by both print heads with a weighting that depends on the location being printed within the stitching region. In one embodiment, for example, the output of each print head is weighted by a linear function of horizontal pixel position. Techniques are also disclosed for selecting screening patterns for use when stitching is performed with variable-dot printers. Such screening patterns are selected to minimize variations in density that may arise as the result of cross-web and/or down-web misregistration.

8 Claims, 12 Drawing Sheets

U.S. PATENT DOCUMENTS

| | | | |
|---|---|---|---|
| 2,995,466 A | 8/1961 | Sorensen | |
| 3,076,721 A | 2/1963 | Coles | |
| 3,107,174 A | 10/1963 | Wartman | |
| 3,129,101 A | 4/1964 | Workman | |
| 3,293,055 A | 12/1966 | Baum | |
| 3,390,994 A | 7/1968 | Cescon | |
| 3,488,705 A | 1/1970 | Fox et al. | |
| 3,539,375 A | 11/1970 | Baum | |
| 3,647,467 A | 3/1972 | Grubb | |
| 3,745,009 A | 7/1973 | Jenkins et al. | |
| 3,832,212 A | 8/1974 | Jenkins et al. | |
| 3,895,173 A | 7/1975 | Adachi | |
| 4,020,232 A | 4/1977 | Kohmura et al. | |
| 4,042,392 A | 8/1977 | Gysling et al. | |
| 4,242,440 A | 12/1980 | Yee et al. | |
| 4,243,052 A | 1/1981 | Bailey | |
| 4,250,511 A | 2/1981 | Stein et al. | |
| 4,290,951 A | 9/1981 | Foley et al. | |
| 4,290,955 A | 9/1981 | Cincotta et al. | |
| 4,328,977 A | 5/1982 | Ozawa et al. | |
| 4,380,629 A | 4/1983 | Yamashita et al. | |
| 4,401,717 A | 8/1983 | Ikeda et al. | |
| 4,415,633 A | 11/1983 | Nakamura et al. | |
| 4,534,288 A | 8/1985 | Brovman | |
| 4,598,299 A | 7/1986 | Koike et al. | |
| 4,602,263 A | 7/1986 | Borror et al. | |
| 4,620,204 A | 10/1986 | Inaba et al. | |
| 4,627,641 A | 12/1986 | Kawaguchi | |
| 4,636,819 A | 1/1987 | Nagamoto et al. | |
| 4,660,052 A | 4/1987 | Kaiya et al. | |
| 4,665,410 A | 5/1987 | Iiyama et al. | |
| 4,734,704 A | 3/1988 | Mizutani et al. | |
| 4,745,046 A | 5/1988 | Borror et al. | |
| 4,833,488 A | 5/1989 | Mizutani et al. | |
| 4,840,933 A | 6/1989 | Usami et al. | |
| 4,956,251 A | 9/1990 | Washizu et al. | |
| 4,965,166 A | 10/1990 | Hosoi et al. | |
| 4,997,410 A | 3/1991 | Polster et al. | |
| 5,055,373 A | 10/1991 | Saeki et al. | |
| 5,119,108 A | 6/1992 | Hatakeyama | |
| 5,196,297 A | 3/1993 | Dombrowski, Jr. et al. | |
| 5,258,274 A | 11/1993 | Helland et al. | |
| 5,284,816 A | 2/1994 | Stephenson | |
| 5,350,870 A | 9/1994 | Boggs et al. | |
| 5,401,619 A | 3/1995 | Boggs et al. | |
| 5,450,099 A | 9/1995 | Stephenson et al. | |
| 5,618,063 A | 4/1997 | Chang et al. | |
| 5,644,352 A | 7/1997 | Chang et al. | |
| 5,663,115 A | 9/1997 | Naito et al. | |
| 5,699,100 A | 12/1997 | Fukuda et al. | |
| 5,710,094 A | 1/1998 | Minami et al. | |
| 5,712,890 A | 1/1998 | Spivey et al. | |
| 5,729,274 A | 3/1998 | Sato | |
| 5,796,420 A | 8/1998 | Kaerts et al. | |
| 5,852,683 A | 12/1998 | Jewel | |
| 5,876,898 A | 3/1999 | Ikeda et al. | |
| 5,885,926 A | 3/1999 | Matsumoto | |
| 5,916,680 A | 6/1999 | Wakata et al. | |
| 6,076,915 A * | 6/2000 | Gast et al. | 347/19 |
| 6,164,847 A | 12/2000 | Allen | |
| 6,188,419 B1 | 2/2001 | Katamoto et al. | |
| 6,197,725 B1 | 3/2001 | Ohkawa et al. | |
| 6,269,177 B1 | 7/2001 | Dewaele et al. | |
| 6,385,349 B1 * | 5/2002 | Teo | 382/284 |
| 6,394,573 B1 * | 5/2002 | Lapstun et al. | 347/19 |
| 6,459,094 B1 | 10/2002 | Wang et al. | |
| 6,464,319 B1 * | 10/2002 | Teshigawara et al. | 347/19 |
| 6,474,767 B1 * | 11/2002 | Teshigawara et al. | 347/19 |
| 6,540,315 B1 * | 4/2003 | Nystrom et al. | 347/12 |
| 6,561,613 B2 * | 5/2003 | Cunnagin et al. | 347/19 |
| 6,631,012 B2 | 10/2003 | Athens et al. | |
| 6,661,443 B2 | 12/2003 | Bybell et al. | |
| 6,801,233 B2 | 10/2004 | Bhatt et al. | |
| 6,832,825 B1 * | 12/2004 | Nishikori et al. | 347/19 |
| 6,951,952 B2 | 10/2005 | Cheon et al. | |
| 7,008,759 B2 | 3/2006 | Cheon et al. | |
| 7,132,203 B2 | 11/2006 | Pierrat | |
| 7,176,161 B2 | 2/2007 | Chu et al. | |
| 7,198,343 B2 * | 4/2007 | Ebihara | 347/12 |
| 7,279,264 B2 | 10/2007 | Cheon et al. | |
| 7,282,317 B2 | 10/2007 | Allen et al. | |
| 7,298,387 B2 | 11/2007 | Busch et al. | |
| 7,379,082 B2 | 5/2008 | Jo et al. | |
| 7,388,596 B2 | 6/2008 | Chung | |
| 7,388,686 B2 * | 6/2008 | Saquib et al. | 358/1.8 |
| 7,708,362 B2 * | 5/2010 | Heiles et al. | 347/9 |
| 2001/0014229 A1 | 8/2001 | Nakata et al. | |
| 2004/0165054 A1 | 8/2004 | Saquib et al. | |
| 2005/0007438 A1 | 1/2005 | Busch et al. | |
| 2005/0270317 A1 | 12/2005 | Gao et al. | |
| 2006/0098038 A1 | 5/2006 | Im | |
| 2006/0152573 A1 | 7/2006 | Busch et al. | |
| 2006/0232642 A1 | 10/2006 | Busch et al. | |
| 2006/0290769 A1 | 12/2006 | Liu et al. | |
| 2006/0292502 A1 | 12/2006 | Busch et al. | |

FOREIGN PATENT DOCUMENTS

| | | |
|---|---|---|
| EP | 0 810 776 A2 | 12/1997 |
| EP | 1 091 560 A1 | 4/2001 |
| JP | 56-126192 | 10/1981 |
| JP | 56002920 | 7/1982 |
| JP | 63-102951 | 5/1988 |
| JP | 2002-301055 | 10/2002 |

OTHER PUBLICATIONS

English translation of Japanese Laid-Open Publication No. 60-234881; Publication Date: Nov. 21, 1985; Application No. 59-91119; Filing Date: May 9, 1984; Applicant: Tomoegawa Paper Co., Ltd.

English translation of Japanese Laid-Open Publication No. 10-315635; Publication Date: Dec. 2, 1998; Application No. 9-128190; Filing Date: May 19, 1997; Applicant: Mitsubishi Paper Mills Ltd.

PCT International Search Report—(PCT/US09/32470) Date of Mailing Mar. 23, 2009.

English translation of Japanese Laid-open Publication No. 56-126192; Publication date: Oct. 2, 1981; Application No. 55-29740; Filing date: Mar. 11, 1980; Applicant: Fujitsu Limited.

Japanese Official Action (Application No. 2002-593159) Dated Feb. 9, 2009 and English translation.

Japanese Official Action (Application No. 2002-593159) Dated Feb. 21, 2007 and English translation.

Abstract of Japanese Laid-Open Publication No. 2000-52653; Publication date: Feb. 22, 2000; Application No. 10-223434; Filing date: Aug. 6, 1998; Applicant: Nippon Kayaku Co Ltd.

International Search Report—(PCT/US2006/024033) Date of Mailing Nov. 22, 2006.

Notice of Allowance in U.S. Appl. No. 11/397,251, Date of Mailing Aug. 4, 2009.

Notice of Allowance in U.S. Appl. No. 12/022,955, Date of Mailing Apr. 8, 2010.

* cited by examiner

IMAGE STITCHING FOR A MULTI-HEAD PRINTER

RELATED APPLICATIONS

This application is a divisional of U.S. patent application Ser. No. 10/374,847, filed Feb. 25, 2003, now U.S. Pat. No. 7,388,686, the contents of which are incorporated herein by reference in its entirety.

BACKGROUND

1. Field of the Invention

The present invention relates to multi-head thermal printers and, in particular, to thermal printers in which multiple print heads are used to print a single image in the form of multiple joined segments.

2. Related Art

Various kinds of printers are well-known in the computing and digital image arts. Such printers include, for example dot-matrix printers, laser printers, Inkjet printers and thermal printers. The focus of the present discussion is on thermal printers, so-named because they use thermal energy (heat) to produce printed output. More specifically, thermal printers typically contain a linear array of heating elements (also referred to herein as "print head elements") that print on an output medium by, for example, transferring pigment from a donor sheet to the output medium or by initiating a color-forming reaction in the output medium. The output medium is typically a porous receiver receptive to the transferred pigment, or a paper coated with the color-forming chemistry. Each of the print, head elements, when activated, forms color on the medium passing underneath the print head element, creating a spot having a particular density. Regions with larger or denser spots are perceived as darker than regions with smaller or less dense spots. Digital images are rendered as two-dimensional arrays of very small and closely-spaced spots.

A thermal print head element is activated by providing it with energy. Providing energy to the print head element increases the temperature of the print head element, causing either the transfer of pigment to the output medium or the formation of color in the receiver. The density of the output produced by the print head element in this manner is a function of the amount of energy provided to the print head element. The amount of energy provided to the print head element may be varied by, for example, varying the amount of power to the print head element within a particular time interval or by providing power to the print head element for a longer time interval.

A single thermal printer may include multiple thermal print heads, which may, for example, be staggered with respect to each other. One example of this kind of printer is described in U.S. Pat. No. 4,660,052 to Kaiya et al., and is described as a heat sensitive recording apparatus with multiple thermal heads disposed in a staggered arrangement along two platen rollers. The apparatus has alternate image segments printed on a first platen roller by a first set of print heads. The intervening segments are filled in by a second set of print heads printing on a second platen roller. The heads are arranged such that the printing of the second set of print heads overlaps the printing of the first set of print heads, forming "stitching" regions between each pair of adjacent segments in which the printing may be adjusted to obscure the presence of a transition from one to the other. In this patent, the method of joinery is described as a simple abutment in which a point of transition is chosen near the center of each stitching region. All pixels to the left of the transition are printed by the left-hand print head of the pair of overlapping heads, and all pixels to the right of the transition points are printed by the right-hand print head of the pair. This method of joinery is troublesome, because it lacks robustness toward imperfections in the printer hardware. For example, if the paper motion is not perfectly perpendicular to the print heads, then the paper may shift slightly to the right or left when traveling from one set of print heads to the other, thereby opening a gap in the stitch or causing an overlap of image segments. In addition to these mechanical imperfections, the thermal print head heats up as it prints, and thermal expansion of the heads can cause a visible overlap of image segments.

U.S. Pat. No. 4,997,410 to Onuki and Denda describes specific means for implementing an abutted joint as described above by means that distribute stitching-region data to the appropriate print heads, depending on whether they are to the right or left of a chosen transition point. This patent describes means for manual readjustment of the stitch so as to eliminate any visible gap or overlap, and also describes paeans for automatically compensating for the effects of thermal expansion of the heads. It would be preferable that no such manual adjustments were required for proper operation.

U.S. Pat. No. 5,119,108 to Hatakeyama describes a very similar system, but adds the recommendation that the image segments be overlapped by 2-4 pixels, thereby eliminating (for all practical purposes) the possibility of a gap opening up between the image segments. This, of course introduces a 2-4 pixel wide region of higher printed density, which the inventors apparently consider to be unobjectionable due to the very narrow width of the overlap. This imperfection, however, extends the full length of the image, and may be visible despite its narrow width.

A solution to this problem is proposed in U.S. Pat. No. 5,450,099 to Stephenson and Fiscella. This patent describes a stitch that is more sophisticated than the simple abutted joint. On each line in the stitching region, the pixels to be printed are divided in a random pattern between the two print heads. Each print head prints approximately one-half of the pixels in the stitch, interleaved so that each pixel is printed either by one or by the other of the two print heads. On each line, the random division of pixels is changed so that there is no recurring pattern from line to line. This avoids correlated defects that extend the full length of the image, but it does place demands on the mechanical and thermal tolerances of the printer, as a misregistration of the patterns will result in significant uncontrolled changes in the printed density of the stitch region. In the case of misregistration, approximately 25% of the pixels will be printed by both print heads, and 25% of the pixels will not be printed by either print head. These randomly occurring increases and decreases of density do not compensate for each other, and an imperfect density is printed.

In view of the drawbacks of these prior-art methods of stitching image segments in thermal printers, there is a need for a method of joining image segments such that mechanical imperfections in the printer hardware, and thermal expansion of the printer components, will not result in visible artifacts in the printed image. The consequence of such a method would be an improvement of image quality, and a reduction in the cost of wide-format thermal printers (since a high-precision transport mechanism would not be required).

SUMMARY

Techniques are disclosed for stitching images printed by a multi-head printer in a manner that is relatively insensitive to misregistration of the image segments. When a pair of overlapping print heads print a pair of adjacent image segments which meet in a stitching region, printing at each location in the stitching region is accomplished by both print heads with a weighting that depends on the location being printed within the stitching region. In one embodiment, for example, the output of each print head is weighted by a linear function of horizontal pixel position. Techniques are also disclosed for selecting screening patterns for use when stitching is performed with variable-dot printers. Such screening patterns are selected to minimize variations in density that may arise as the result of cross-web and/or down-web misregistration.

Other features and advantages of various aspects and embodiments of the present invention will become apparent from the following description and from the claims.

DETAILED DESCRIPTION

Techniques are disclosed for stitching images printed by a multi-head printer in a manner that is relatively insensitive to misregistration of the image segments. When a pair of overlapping print heads print a pair of adjacent image segments which meet in a stitching region, printing at each location in the stitching region is accomplished by both print heads with a weighting that depends on the location being printed within the stitching region. In one embodiment, for example, the output of each print head is weighted by a linear function of horizontal pixel position. Techniques are also disclosed for selecting screening patterns for use when stitching is performed with variable-dot printers. Such screening patterns are selected to minimize variations in density that may arise as the result of cross-web and/or down-web misregistration.

In various embodiments of the present invention, techniques are provided for use in a printer to stitch images in a manner that is relatively insensitive to small and unintended misregistration of the image segments. The misregistration may be either "down-web" (i.e., in the direction of the paper motion), or "cross-web" (i.e., transverse to the paper motion, and along the print heads).

Figure 1A:
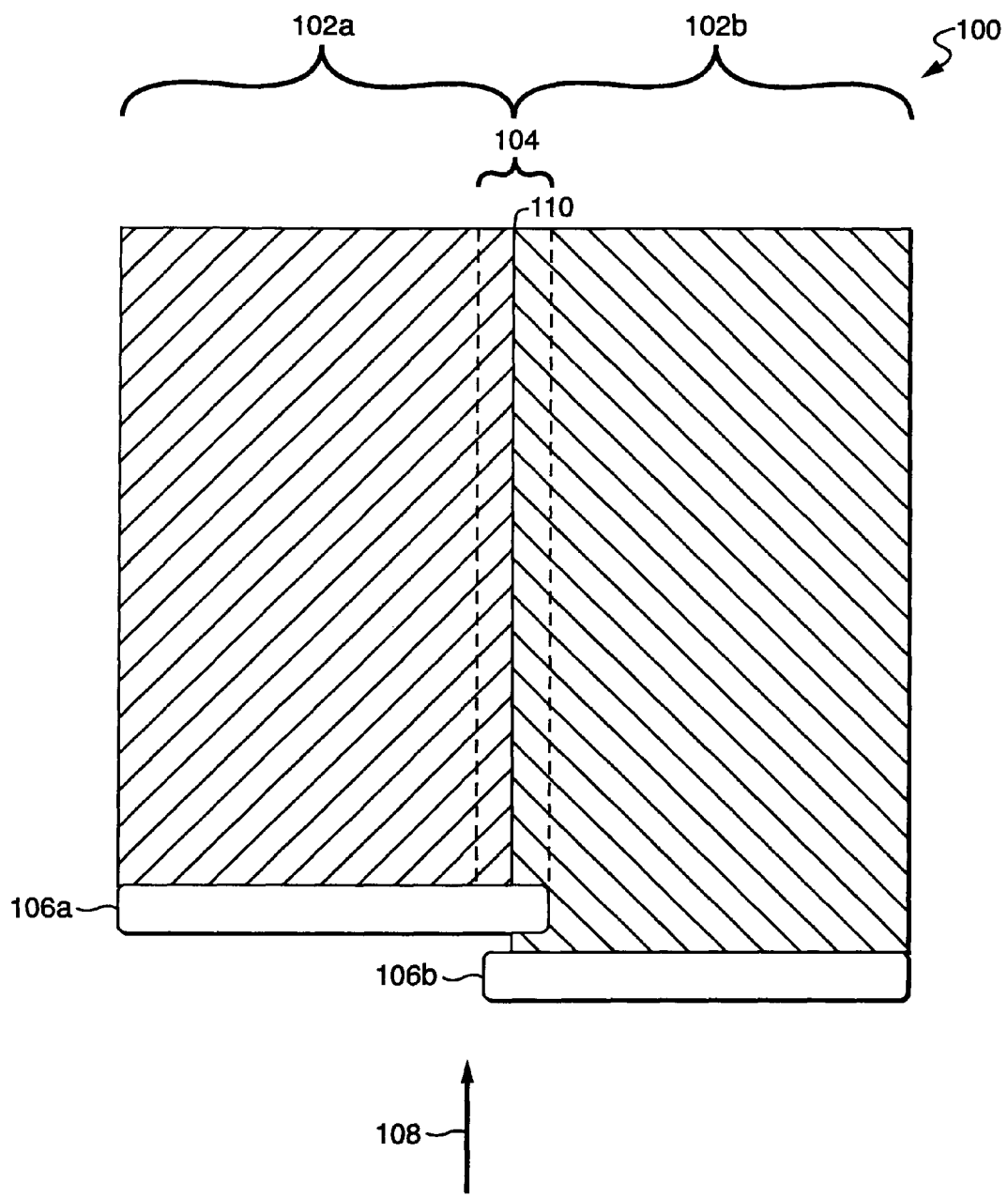
FIG. 1A is a diagrammatic representation of an image region in which two sub-regions are printed by a multi-head printer using a prior-art abutment joint and in which the two sub-regions meet exactly at the center of a stitching region.

Referring to FIG. 1A, an image region 100 is shown in diagrammatic form for purposes of example. The region 100 represents a region of an image printed by a multi-head printer using a simple abutment joint, as described above. Region 100 includes two sub-regions 102a-b. In the present example, region 102a is printed by a first print head 106a and region 102b is printed by a second print head 106b in a thermal printer. Print heads 106a-b are illustrated in block form for ease of illustration. Paper moves through the printer in the direction indicated by arrow 108. The patterns illustrated within regions 102a-b are provided merely for purposes of example. In actual implementation, the regions 102a-b may include any image data.

Region 100 also includes a sub-region 104 in which print heads 106a and 106b overlap. The overlapping region 104 is also referred to herein as a "stitching region" or, more simply, as a "stitch." For ease of illustration and explanation, the contents of the regions 102a-b are illustrated in FIG. 1 using hatch patterns to represent image data having constant and equal densities. FIG. 1A illustrates the case in which the region 100 is printed with perfect registration, and in which the image segments printed by heads 106a-b therefore meet exactly at the center line 110 of the stitching region 104 without overlapping. In the case of perfect registration, therefore, center line 110 indicates the point at which one print head stops printing and the other one begins.

According to various embodiments of the present inventions, images may be stitched in a manner that is relatively insensitive to small and unintended misregistration of the image segments (e.g., the regions 102a-b) by abandoning the requirement that each pixel in the stitching region 104 be printed by either one of the print heads 106a-b or by the other. Instead, printing at each location in the stitching region 104 is accomplished by both print heads 106a-b, and with a weighting that depends on the location within the stitching region 104. On the left-hand side of the stitching region 104, the media is printed primarily by the left-hand print head 106a, and on the right-hand side of the stitching region 104 it is printed primarily by the right-hand print head 106b. In this fashion, there is a gradual transition across the stitching region 104 from one of the print heads 106a-b to the other.

Figure 2:
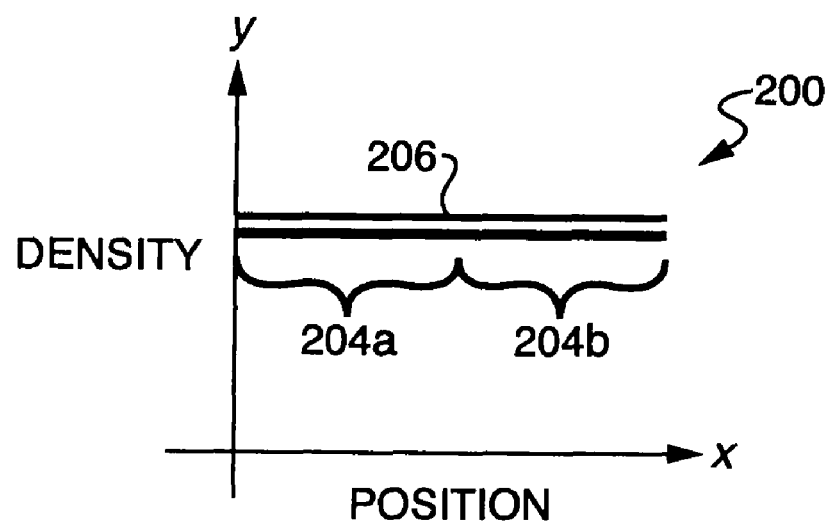
FIG. 2 is a graph illustrating the relationship between pixel position and density in the image region illustrated in FIG. 1A.
Figure 3:
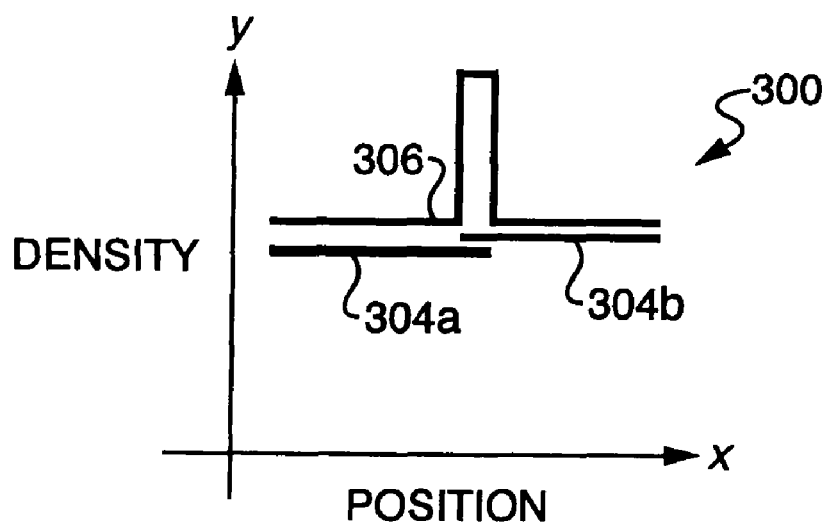
FIG. 3 is a graph illustrating the relationship between pixel position and density in the image region illustrated in FIG. 1B.

A schematic illustration of the difference between the traditional abutted joint, and the "graded" joint disclosed herein is made in FIGS. 2-3. It is assumed in FIGS. 2-3 that one is attempting to print a constant density across the stitching region 104. Referring to FIG. 2, for example, a graph 200 is shown which illustrates the relationship between pixel position and density in the case of an abutted joint, in which an abrupt transition is made from one of the print heads 106a-b to the other at the center of the stitching region 104 (as shown in FIG. 1A). Curve 204a illustrates the density printed by the first print head 106a, curve 204b illustrates the density printed by the second print head 106b, and curve 206 illustrates the combined density of curves 204a and 204b.

In the case of an abutted joint, each of the two overlapping print heads 106a-b prints up to the transition point (at the center of stitching region 104 in FIG. 1A), but not beyond. When the paper is moving perfectly from one platen to the other, and the temperature is well controlled, then one may adjust the positions of the print heads 106a-b, and the transition point on each print head, so that the transition is perfect, resulting in a net density that is perfectly uniform across the stitching region 104. This case is illustrated in FIG. 1A and by curve 206 in FIG. 2, which is uniform for all positions.

Figure 1B:
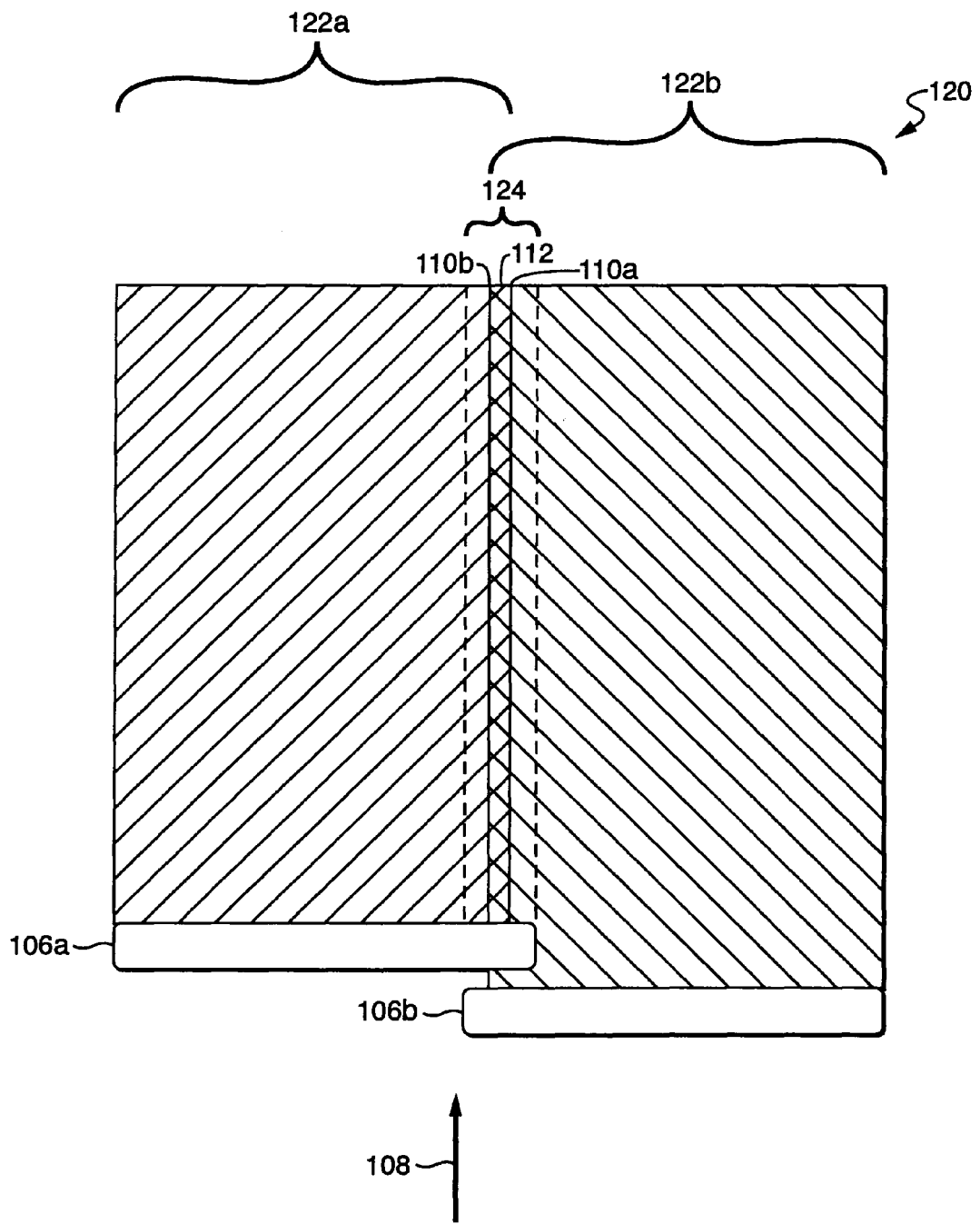
FIG. 1B is a diagrammatic representation of an image region in which two sub-regions are printed by a multi-head printer using a prior-art abutment joint and in which a horizontal misregistration has caused the two sub-regions to partially overlap within the stitching region.

If, however, the print heads 106a-b expand, or if the paper path is imperfect, the printing from the second print head 106b may unintentionally overlap the printing of the first print head 106a, yielding an overlap region of higher density. Referring to FIG. 1B, for example, an image region 120 is shown which is similar to the image region 100 of FIG. 1A. For example, the region 120 includes sub-regions 122a-b printed by print heads 106a-b, respectively, on an output medium moving in direction 108. The region 120 also includes a stitching region 124. For purposes of the present discussion, the contents of the stitching region 124 are illustrated in FIG. 1B to indicate that the patterns shown in regions 122a and 122b are printed at the same densities within stitching region 124 as those printed outside of the stitching region 124.

As shown in FIG. 1B, sub-regions 122a-b overlap within a sub-region 112 of stitching region 124 as a result of horizontal misregistration. As indicated in FIG. 1B, as a result of this misregistration, the right edge 110a of the sub-region 122a (printed by print head 106a) is to the right of the left edge 110b of the sub-region 122b (printed by print head 106b), causing the sub-regions 122a-b to overlap in the region 112. This overlap causes the overlap region 112 to be of higher density than either region 122a or 122b.

Referring to FIG. 3, a graph 300 is shown which illustrates the relationship between pixel position and density in the case the region 120 shown in FIG. 1B. Curve 304a illustrates the density printed by the first print head 126a, curve 304b illustrates the density printed by the second print head 126b, and curve 306 illustrates the combined density of curves 304a and 304b. As illustrated by curve 306, the overlap between the output printed by the two print heads 126a-b causes the total density to spike within the overlap region 112, which is a sub-region of the stitching region 124. Alternatively, the paper or print mechanism may move or distort in such a way that a gap develops between the regions 122a-b, leading to a narrow region of very low density (not shown).

In the following discussion of various embodiments of the present invention, reference will be made to output produced by the print heads 106a-b. Although the print heads 106a-b are illustrated in FIGS. 1A-1B as producing output using prior art techniques, the same print heads 106a-b may be controlled to produce output according to various embodiments of the present invention. Furthermore, to the extent that the techniques disclosed herein may require modification to the print heads 106a-b, any description of such techniques should be interpreted to refer to appropriately-modified print heads rather than to the prior art print heads 106a-b.

Figure 4:
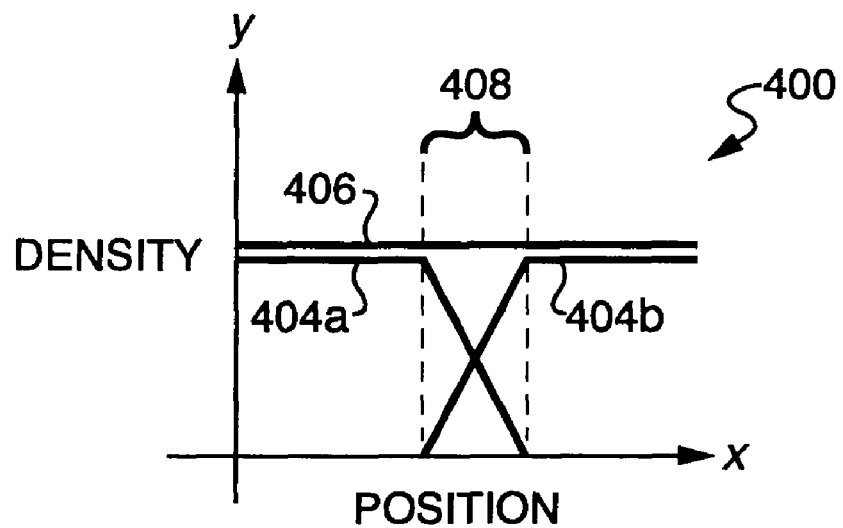
FIG. 4 is a graph illustrating weighting functions that are applied to overlapping print heads according to one embodiment of the present invention and the resulting total output density when no misregistration occurs.

Referring to FIG. 4, a graph 400 is shown which illustrates the relationship between pixel position and density in the case of images printed according to various embodiments of the present invention. Curve 404a illustrates the density printed by the first print head 106a, curve 404b illustrates the density printed by the second print head 106b, and curve 406 illustrates the combined density of curves 404a and 404b.

In FIG. 4, the dashed lines indicate a corresponding stitching region 408 in the output image. To the left of the stitching region 408 the left-hand print head 106a prints the desired density, and within the stitching region 408 the left-hand print head 106a prints a density that is graded from full density to zero density. By the same token, the right-hand print head 106b prints the desired density to the right of the stitching region 408, and within the stitching region 408 the right-hand print head 106b prints a lower density, graded from right to left in such a way that the combination of the density printed by the left and right print heads 106a-b combines to form the desired density. Although in FIG. 4 the curves 404a-b are linear and have equal and opposite slopes within the stitching region 408, this is not a limitation of the present invention. Rather, as will be described in more detail below, other weighting functions may be used to combined the output of the print heads 106a-b within the stitching region 408.

When the paper path is perfect, as in the example shown in FIG. 4, and the temperature is well controlled, the printing method just described results in a density that is uniform across the stitching region 408, just as in the case of the abutted joint. However, in the case of a misregistration, the density change that results from the printing method described above with respect to FIG. 4 extends over many pixels and is of much lower amplitude than in the case of a misregistration when an abutted joint is used.

Figure 5:
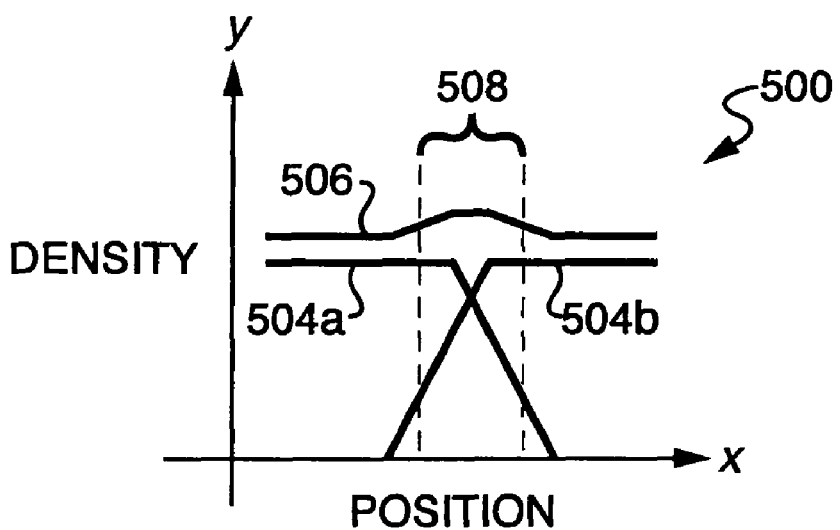
FIG. 5 is a graph illustrating weighting functions that are applied to overlapping print heads according to one embodiment of the present invention and the resulting total output density when a horizontal misregistration occurs.

For example, referring to FIG. 5, a graph 500 is shown which illustrates the relationship between pixel position and density in the case of images printed according to various embodiments of the present invention when there is a misregistration. The meaning of curves 504a-b and 506 are the same as curves 404a-b and 406 (FIG. 4), respectively.

Assuming for example that the stitching region 508 is 100 pixels wide, a misregistration of 1 pixel results in a density change of only about 1%, peaking in the center of the stitching region 508. In the case that the image segments move apart from each other, no gap appears between them. Instead, there is a small decrease of density in the misregistered region (again about 1% for a 1 pixel misregistration).

Figure 6A:
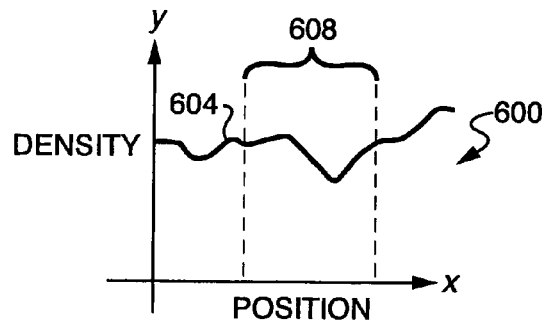
FIGS. 6A-6F are graphs illustrating the application of embodiments of the present invention to non-uniform image data.

This method applies even when the printed material itself is not uniform across the stitching region. In the more general case, the image data in each line will vary across the stitch, as illustrated in FIGS. 6A-6F. Referring to FIG. 6A, for example, a graph 600 is shown in which a curve 604 represents image data to be printed. As shown in FIG. 6A, curve 604 varies in density across stitching region 608.

Figure 6B:
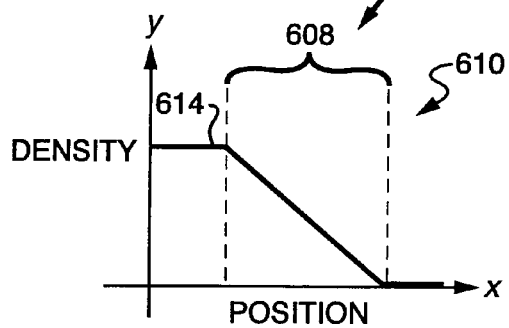
Figure 6C:
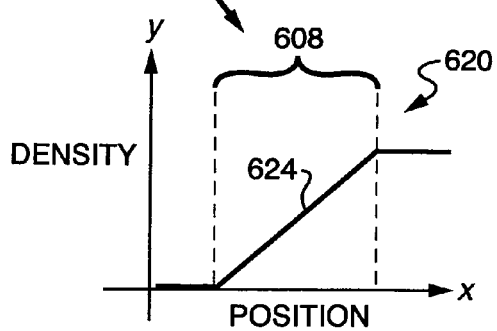

Referring to FIG. 6B, a graph 610 is shown in which a curve 614 represents a linear weighting function to be applied to the output of the first print head 106a. Similarly, referring to FIG. 6C, a graph 620 is shown in which a curve 624 represents a linear weighting function to be applied to the output of the second print head 106b. The curves 614 and 624 show that fraction of the density that will be printed by the print heads 106a-b, respectively.

Figure 6D:
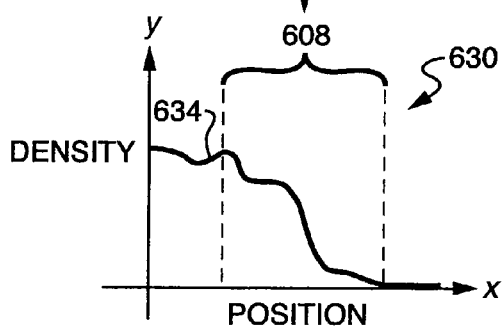
Figure 6E:
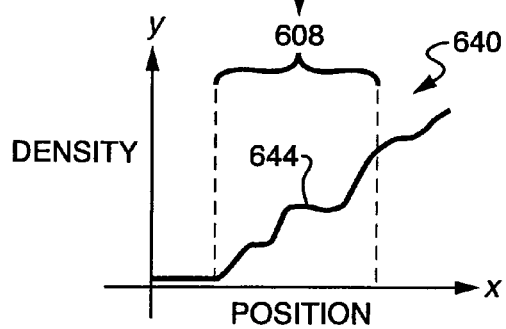
Figure 6F:
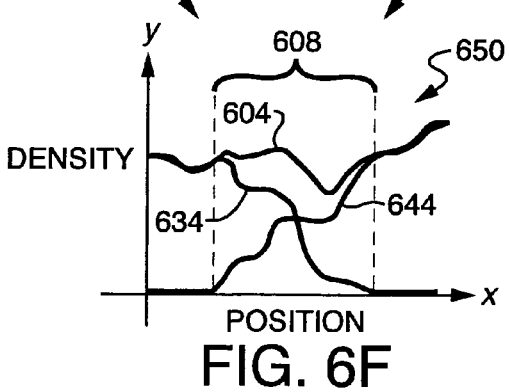

Referring to FIGS. 6D-6E, graphs 630 and 640 illustrate the result of multiplying the image data 604 by the weight functions 614 and 624, respectively, and represent the densities to be printed by the print heads 106a-b, respectively. Referring to FIG. 6F, graph 650 combines graphs 600 (FIG. 6A), 630 (FIG. 6D), and 640 (FIG. 6E), and thereby illustrates how the desired total image density 604 is composed from the densities printed by each of the print heads 106a-b (illustrated by graphs 634 and 644, respectively).

In order to implement this method of stitching, it is necessary to consider the details of the printing method being used. Generally speaking, there are two classes of thermal printing methods, referred to as "variable-density" and "variable-dot" printing. In variable-density printing, each pixel is filled with a uniform dye density; this uniform density changes as heat is applied to the medium. In variable-dot printing, a dot of maximum density is formed in the pixel; the size of the dot increases as heat is applied. The apparent printed density in a variable-dot printer is determined primarily by the fraction of the printed surface covered by ink. In actuality, printers are not ideal, and may print pixels that are neither uniformly filled with dye nor perfect dots of maximum density. However, so-called "dye diffusion thermal transfer" (D2T2) printers are generally considered to be variable-density in nature, and wax-transfer thermal printers are best described as variable-dot.

The techniques described above may be applied in a straightforward way to variable-density printers, although the densities printed by the two print heads 106a-b may not be perfectly additive. Those of ordinary skill in the art will appreciate that in the event of imperfect additivity of the two print heads 106a-b, the resulting printed density may be lower or higher than the intended density, and that modification of the weighting functions for the two print heads 106a-b may be used to compensate for the imperfection.

For variable-dot printers, however, there is a further complication arising from the printing of isolated dots. In particular, in variable-dot printers the printed density in the stitch depends sensitively on whether the dots printed by one print head fall on top of, or in between, the dots printed by another print head. The former case is referred to as "dot-on-dot" printing, and the latter as "dot-off-dot" printing.

Figure 7A:
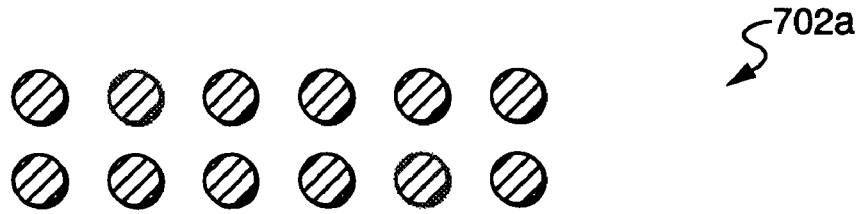
FIGS. 7A-7B illustrate dot patterns arranged in rectangular grids.
Figure 7B:
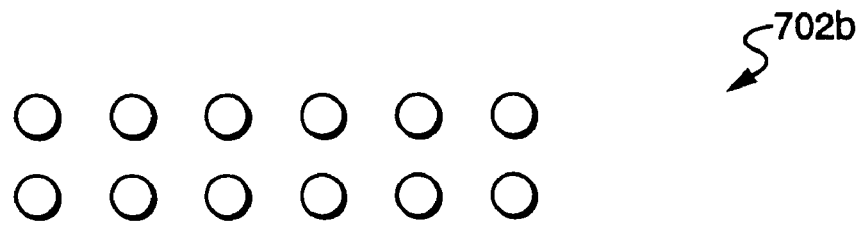
Figure 7C:
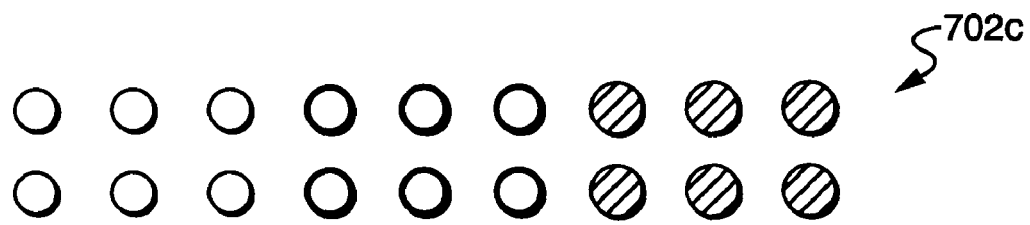
FIG. 7C illustrates the dot patterns of FIGS. 7A-7B overlapped in a dot-on-dot arrangement.

For example, referring to FIGS. 7A-7B, two image segments 702a-b are shown, each of which is printed in a rectangular grid. Although the dots in the image segments 702a-b are shown as having different sizes and patterns, this is merely to make the two sets of dots distinguishable from each other. The dots in image segments 702a-b are intended to represent dots having the same size and density. The dot sizes shown represent mid-tone densities, for which density shifts from misregistration are most significant. Dots of larger size may overlap both when registered and when misregistered, and may even extend into adjacent pixels. In these cases, the term "dot-off-dot" may be taken to mean the registration giving minimum overlap. Significant overlaps of this type tend to subdue density variations and are not illustrated here. Referring to FIG. 7C, an image 702c representing a simple dot-on-dot overlap of the images 702a-b is shown.

Figure 7D:
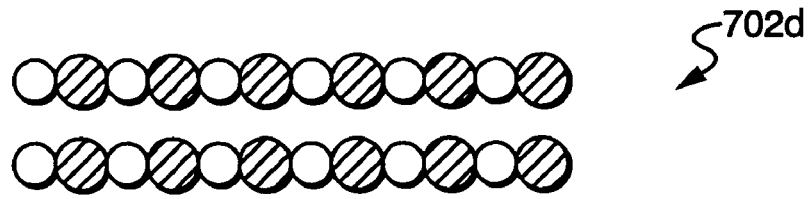
FIG. 7D illustrates the dot patterns of FIGS. 7A-7B overlapped in a dot-off-dot arrangement.

A shift of the image segments 702a-b by one-half pixel with respect to each other will change the merged image 702c from a complete dot-on-dot overlap to a nearly dot-off-dot overlap. This situation is shown by image segment 702d in FIG. 7D. Likewise, a down-web misalignment of dots can also move the dots from complete dot-on-dot alignment to nearly dot-off-dot alignment.

The density change resulting from this change in registration may be large. If we take the fill-factor of the dots printed by each of the print heads 106a-b to be "f", the density inside the dot to be "Dmax", and the density outside the dot to be "Dmin", then the apparent printed density on each side of the stitch is shown by Equation 1

$$D = -\log_{10}\left((1-f)\cdot 10^{-D_{min}} + f\cdot 10^{-D_{max}}\right) \qquad \text{Equation 1}$$

It should be appreciated that Equation 1 is approximate and should be taken only as an estimate of the magnitude of the density changes that will occur. Equation 1 does not, for example, consider scattering or multiple reflections in the medium.

For the purposes of estimation, we may take Dmin to be 0, and Dmax to be about 2, so that this result becomes as shown in Equation 2.

$$D = -\log_{10}\left((1-f) + f\cdot 10^{-D_{max}}\right) \approx -\log_{10}(1-f) \qquad \text{Equation 2}$$

provided that f is not close to 1. This means that the apparent density depends primarily on the fill factor. In a dot-on-dot situation the fill factor in the stitch region is approximately the same for the overlapped segments as for the individual unweighted image segments. On the other hand, when the two segments are dot-off-dot (and provided that the dots are not large enough to overlap in the dot-off-dot situation) then the fill factor is doubled. In particular, the situation for small values of f is indicated by Equation 3:

$$D \approx -\log_{10}(e)\log_e(1-f) \approx f\cdot\log_{10}(e) \qquad \text{Equation 3}$$

This effect means that the production of a desired density in the stitch as a combination of the weighted density of two overlapping segments is quite difficult for a variable-dot printer, because it requires a knowledge of whether the printing is dot-on-dot or dot-off-dot (or somewhere between). This, in turn, requires precision control of the paper transport and of thermal expansion, thereby potentially counteracting the benefits of the techniques described above.

Figure 8A:
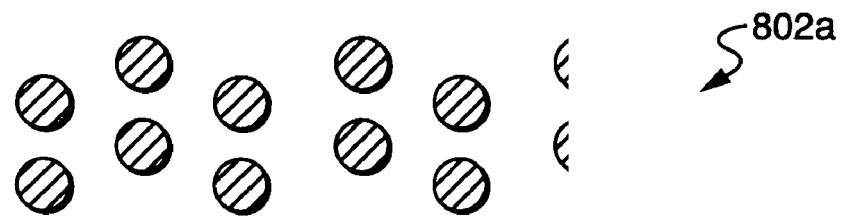
FIG. 8A illustrates a dot pattern in a staggered arrangement.
Figure 8B:
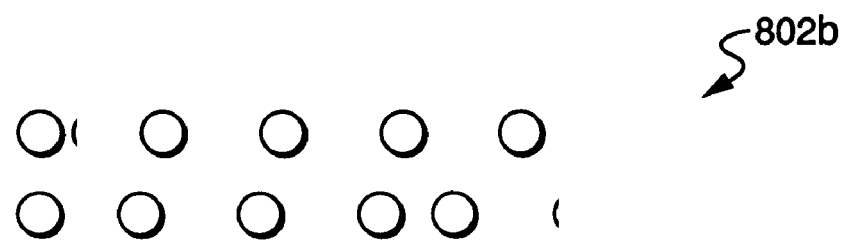
FIG. 8B illustrates a dot pattern in a rectangular arrangement
Figure 8C:
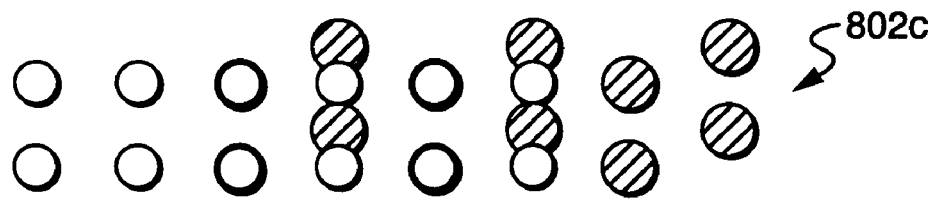
FIG. 8C illustrates the dot patterns of FIGS. 8A-8B overlapping with each other.

A very small change in the printed patterns can change this situation significantly. For example, referring to FIGS. 8A-8B, two image segments 802a-b are shown. The second image segment 802b (FIG. 8B) (like the image segment 702b shown in FIG. 7B) is printed in a rectangular grid. The first image segment 802a (FIG. 8A), however, is printed with its dots staggered. Referring to FIG. 8C, an image 802c representing an overlap of the images 802a-b is shown.

Staggering the positions of the dark black dots in image 802a creates a situation in which only half of the dots in the overlap region of the image 802c are dot-on-dot. Although it is still true that a cross-web shift of a half-pixel will take us to a nearly dot-off-dot situation, in the image 802c there is no positioning that leads to a completely dot-on-dot configuration. In other words, the change in fill factor from dot-on-dot to dot-off-dot has been reduced by about 2, compared to the situation illustrated in FIGS. 7A-7D. It is also true that down-web misregistration in the situation illustrated in FIGS. 8A-8C leads to smaller variations, since a shift of a half-pixel in that direction brings us from 50% dot-on-dot overlap back to another 50% dot-on-dot overlap, and there is no position (for dots of the size illustrated) in that direction for which the printing is entirely dot-off-dot.

This effect can be further improved by identifying improved dot patterns. In principle, the dot placement may be varied in both the cross-web and the down-web direction, but conventional print heads have uniform pixel spacing, and the design of the printer is simplified if all the print heads have the same pixel spacing. Therefore, the discussion is limited to the case in which the dot position is only varied in the down-web direction, although this is not a limitation of the present invention.

In this case, it is always possible to achieve complete dot-off-dot printing for small dots by shifting the image segments cross-web so that their columns interlace. Departures from this alignment will lead to various degrees of dot-on-dot printing. The best patterns are those that limit the maximum amount of dot-on-dot overlap, since this will limit the density variation between the full dot-off-dot printing alignment and maximum dot-on-dot alignment.

There is also a second constraint, not satisfied by the example described above with respect to FIGS. 8A-8C. Namely, when the screening described herein is being used to stitch two image segments, it is desirable that the two segments have patterns that are similar enough that the response curves and thermal corrections will be the same for all image segments. In the example just given with respect to FIGS. 8A-8C, a rectangular pattern (FIG. 8B) was combined with a staggered pattern (FIG. 8A). These two patterns are typically different in both response curve and thermal corrections, and this makes the control of printed density and color from one of the segments $802a$-$b$ to the next quite complicated. Fortunately, in many cases there are distinct patterns with symmetries that make them equivalent in these aspects.

For ease of explanation, the following discussion is restricted to dot patterns in which dot location within a pixel is chosen from among a set of N equally spaced down-web locations or "phases," and the sequence of locations is a repeating pattern in the lateral direction. This is not, however, a limitation of the present invention.

Figure 9A:
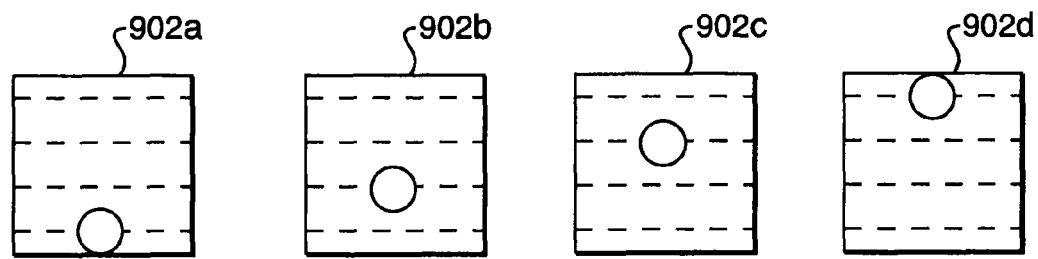
FIG. 9A illustrates four example pixels, each of which includes a single dot in a distinct one of four dot positions.

Consider, for example, the case in which N=4. In this case there are four equally spaced down-web locations for the dot within the pixel. Referring to FIG. 9A, four example pixels $902a$-$d$ are shown, each of which includes a single dot in a distinct one of the four dot positions (phases). Phases are illustrated in FIG. 9A, and in the remaining figures, using dashed lines on which dots are centered. The particular dot shapes and sizes used in the drawings are shown merely for purposes of example. More generally, dots may be of any shape and grow outward to any size.

Figure 9B:
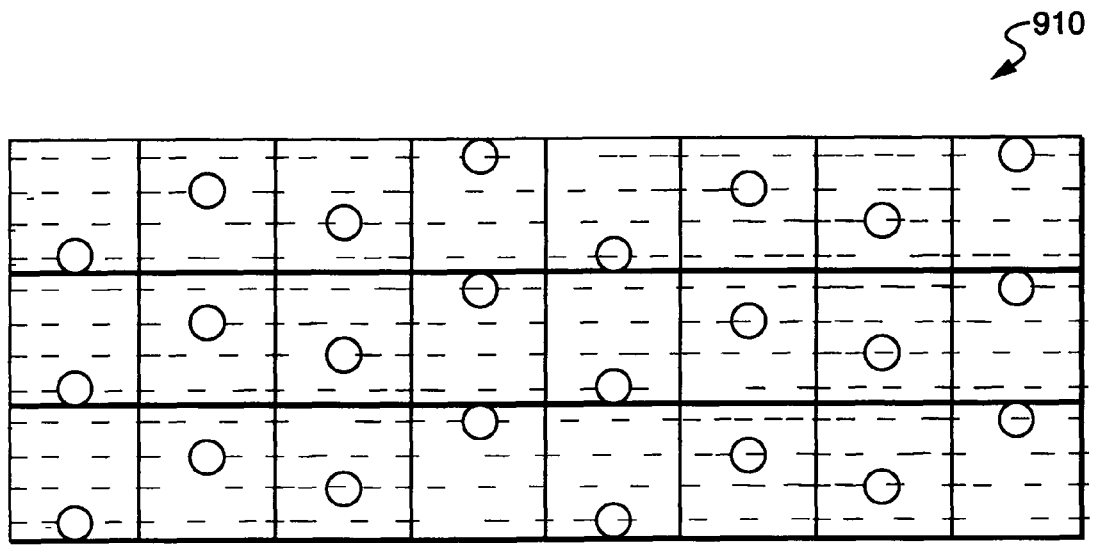
FIG. 9B illustrates a pattern formed from a repeating pattern of the four pixels shown in FIG. 9A.

The phases may be numbered from 1 to 4, for example, and may be used in any repeating order. In this illustration, the length of the repeating order will be limited to the number of phases, so that each phase will be represented exactly once in the sequence. The sequences may then be labeled by the sequence of phases. For example, the label 1 3 2 4 refers to the repeating sequence of phases "1 3 2 4 1 3 2 4 1 3 2 4 . . . ", and will result in lines of pixels forming a pattern 910 shown in FIG. 9B. The entire pattern 910 is signified by just four numbers giving the order of the four phases, in this case 1 3 2 4.

Since there are 4!=24 different ways of arranging four numbers, one might conclude that there are 24 different patterns available for the 4-phase system. However, there are actually only three different patterns, because many of the 24 patterns are equivalent. For example, if the pattern above (1 3 2 4) had been described starting in the second column rather than the first, it would have been called 3 2 4 1, although this clearly describes the same pattern. In other words, any cyclic permutation of the four numbers in a pattern leads to an equivalent pattern.

By the same token, if one describes the same pattern but starting at different phase positions, the result is another set of labels that is different from but equivalent to the original set of labels. For example, moving one phase position up-web turns the label 1 3 2 4 into 2 4 3 1, as may be seen visually from observing FIG. 9B. This is the result of adding 1 to each number in the original label, and taking the results modulo 4.

Following these two rules for finding equivalent labels, we find that the 16 labels shown in Table 1 all describe exactly the same pattern:

TABLE 1

| Down-Web Shifts | Cross-Web Shifts | | | |
|---|---|---|---|---|
| | 1 3 2 4 | 3 2 4 1 | 2 4 1 3 | 4 1 3 2 |
| | 2 4 3 1 | 4 3 1 2 | 3 1 2 4 | 1 2 4 3 |
| | 3 1 4 2 | 1 4 2 3 | 4 2 3 1 | 2 3 1 4 |
| | 4 2 1 3 | 2 1 3 4 | 1 3 4 2 | 3 4 2 1 |

In other words, of 24 possible labels, 16 are equivalent and describe a single physical pattern. The remaining 8 fall into two groups of 4, and then represent diagonal lines of positive and negative slope, as follows:

Pattern 1: 1 2 3 4→2 3 4 1→3 4 1 2→4 1 2 3

Pattern 2: 4 3 2 1→3 2 1 4→2 1 4 3→1 4 3 2

These two groups have only 4 members rather than 16 because the down-web shifts, in these cases, leads to the same labels as the cross-web shifts.

Figure 9C:
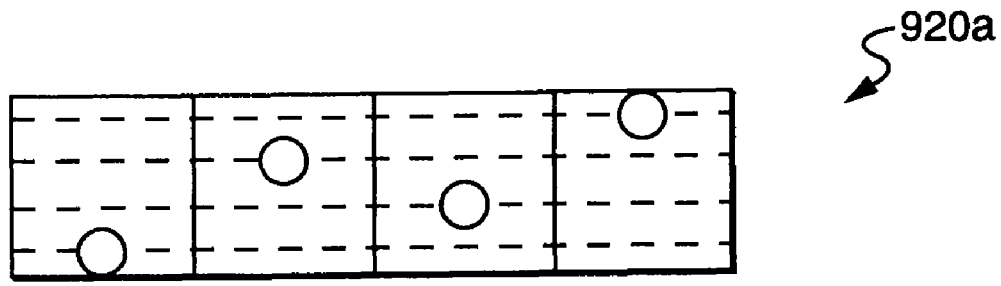
FIGS. 9C-9E illustrate three four-pixel patterns that may be used to perform screening according to embodiments of the present invention.
Figure 9D:
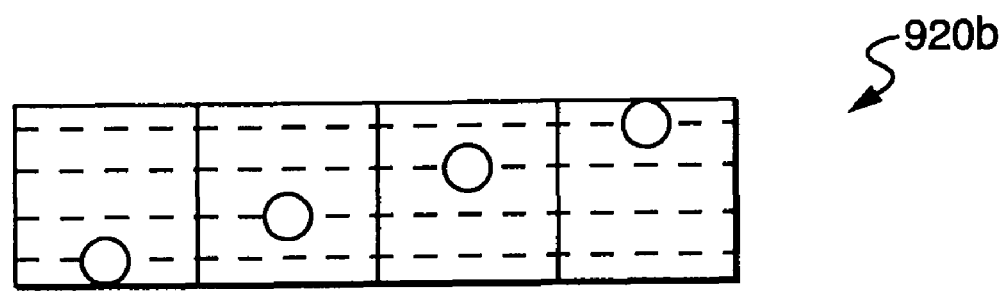
Figure 9E:
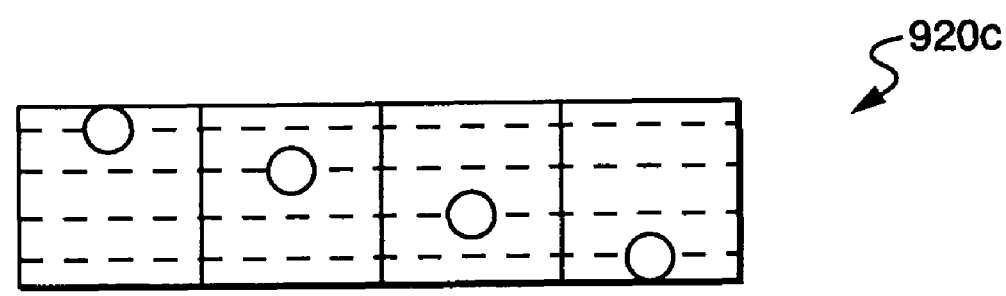

Therefore, in conclusion, the N=4 case has just three distinct patterns. Referring to FIGS. 9C-9E, examples $920a$-$c$ of each such pattern are shown. Any one of these three patterns $920a$-$c$ may be used on one of the print heads in a stitch, and another on the other print head. However, the performance will not be equivalent for all pairs. It is desirable to find two patterns with the property that, no matter what the misregistration, the maximum amount of dot-on-dot overlap is as small as possible. It is, of course, true that no matter which two patterns are chosen, there is always some registration in which at least one dot of one pattern is directly on top of one dot of the other one dot per repeat unit, that is). Therefore, we know that the best we achieve is that, independent of registration, no more than one dot per repeat unit of the first pattern ever falls directly on top of a dot in the repeat unit of the other.

Figure 10:
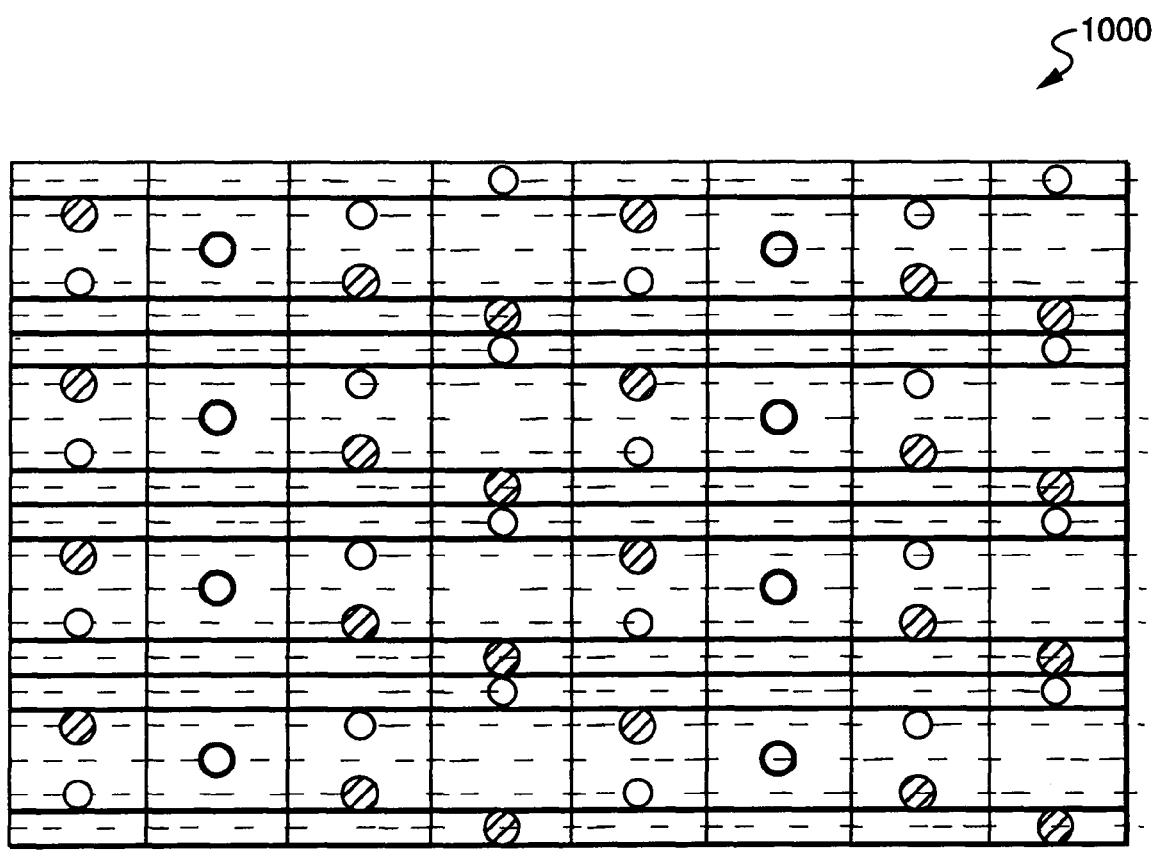
FIG. 10 illustrates a superimposition of two different four-pixel patterns.

Consider, for example, the second and third patterns $920b$-$c$ in the case N=4. These two patterns have the property that although they are distinct, they have a vertical symmetry that ensures that they will share a common response curve and thermal control characteristics. However, it is not true that they overlap by only one pixel per unit cell independent of registration. The superposition of the two patterns $920b$-$c$ can lead to situations in which two of the four dots per unit cell are registered. Referring to FIG. 10, an example of such a superimposition 1000 of the two patterns $920b$-$c$ is shown.

The same turns out to be true of any two of the N=4 patterns. This leads, then, to the question whether there are any values of N for which there are patterns that overlap by at most one pixel per repeat unit. This is a question that may be resolved, for example, by computer modeling. Those of ordinary skill in the art, for example, will understand how to implement a software program to generate all possible patterns for a particular value of N and to determine which, if any, of such patterns have a worst-case overlap of one dot per repeat unit. If any such patterns are found, such patterns may be searched to determine whether they include any pairs of patterns which are related by a symmetry which signals that they are thermally equivalent (i.e., will have the same gamma curve and thermal history control). Table 2 lists results obtained for several values of N using such a computer modeling approach.

TABLE 2

| Number of Phases N | Number of Permutations | Number of Distinct Patterns | Number of pattern pairs with single dot overlap |
|---|---|---|---|
| 3 | 6 | 2 | 1 |
| 4 | 24 | 3 | 0 |
| 5 | 120 | 8 | 6 |
| 6 | 720 | 24 | 0 |
| 7 | 5040 | 108 | 27 |

Figure 11:
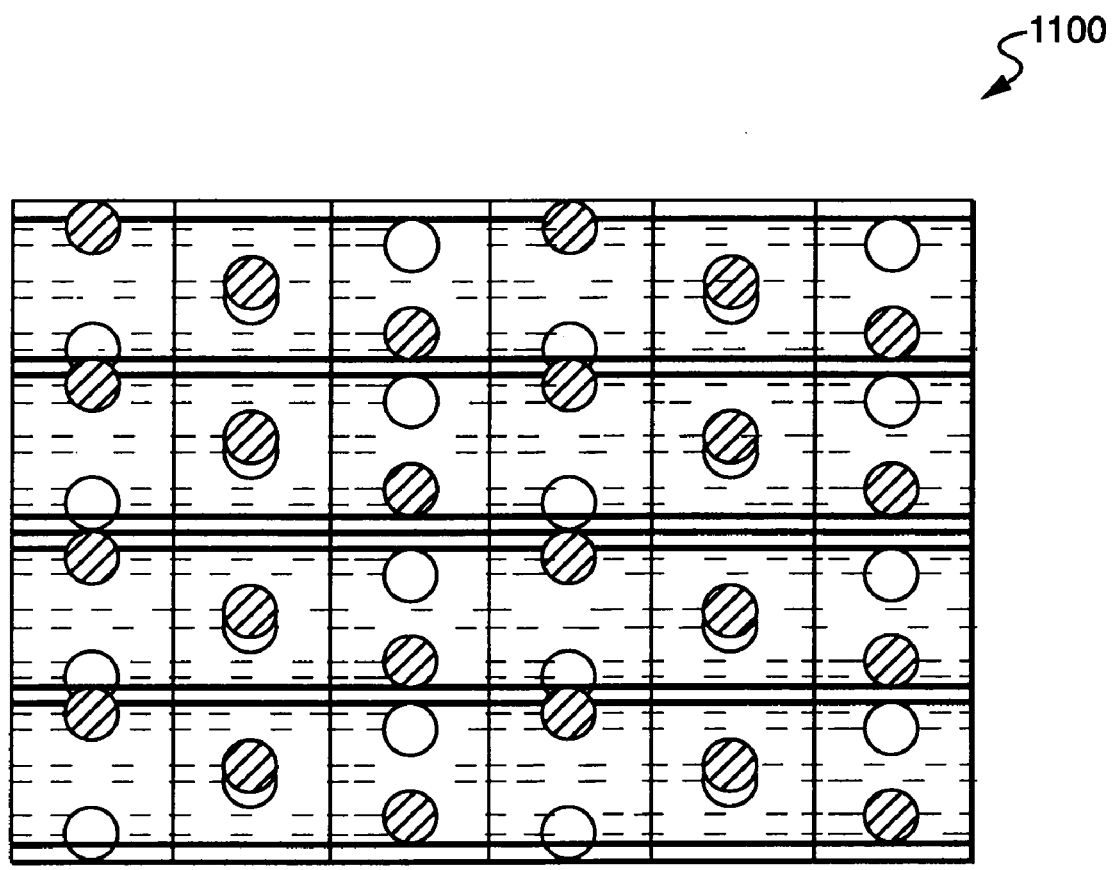
FIG. 11 illustrates a superimposition of two different three-pixel patterns with a vertical misregistration.
Figure 12A:
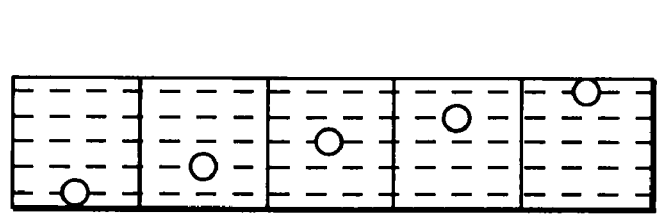
FIGS. 12A-12D illustrate four different five-pixel patterns that may be used to perform screening according to various embodiments of the present invention.
Figure 12B:
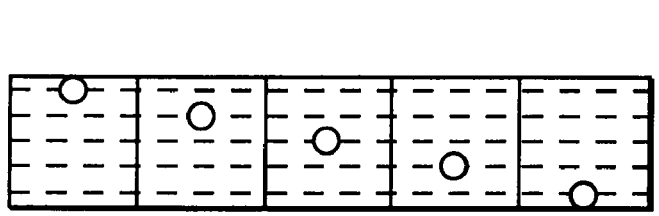
Figure 12C:
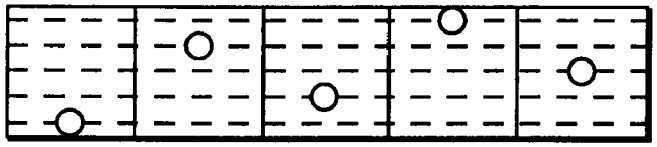
Figure 12D:
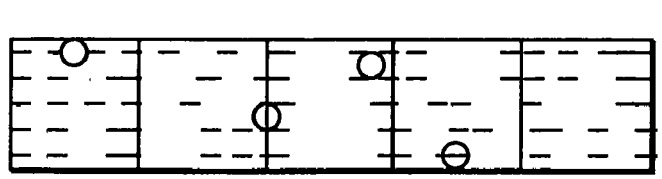

Examples will now be described of pattern pairs which satisfy the criteria just described when the number N of phases is odd. For example, the case of N=3 phases has two patterns, containing the exemplar labels 1 2 3 and 3 2 1. When these two patterns are plotted, they appear as shown in the image segment 1100 in FIG. 11. The image segment 1100 represents a randomly selected registration.

When these two patterns are misregistered horizontally or vertically, there is no relative position at which more than one dot per unit-cell (the unit-cell being three dots in size) is coincident. This is a benefit to both cross-web and down-web misregistration, as it limits the range of density variations that may occur.

In the case of N=5 there are eight distinct patterns. Four of these patterns have the mutual property of not overlapping by more than one dot per unit-cycle. Referring to FIGS. 12A-12D, examples 1200*a-d* of each of the patterns are shown. From the symmetry of these patterns 1200*a-d*, we discern that the first and second patterns 1200*a-b* will share the same response curve and thermal characteristics. The same is true of the third and fourth patterns 1200*c-d*.

It should be evident that the use of phase patterns to modify the location of printed dots on the line will introduce a small amount of distortion into the printed image. Those of ordinary skill in the art will recognize that this distortion may be removed by resampling the image before printing to arrive at estimates for the image data at the phase-shifted pixel positions at which printing will actually occur.

It is to be understood that although the invention has been described above in terms of particular embodiments, the foregoing embodiments are provided as illustrative only, and do not limit or define the scope of the invention. Various other embodiments, including but not limited to the following, are also within the scope of the claims.

Although the dots in the examples above are circular, this is not a limitation of the present invention. Other dot shapes that may be used include, for example, elliptical dots which are wider than they are tall. When such dots are used there will be less interstitial horizontal space for dots to move into if horizontal misregistration occurs.

Although the examples provided above are described in relation to density screening, the same techniques may be applied to color screening in color images. In this case, each color may be independently stitched according to the techniques just described. The overlaid printing of these color separations then leads to a full color image. It is important to note, however, that each of the color planes is in its entirety a variable-dot image, and that its registration with respect to other color planes will affect the color of the printed images. Therefore, it is valuable to use the screening of image segments not only to improve the quality of the stitches, but also to reduce the variability of image density and color. Since there is generally no issue of balancing the thermal properties of different color planes, this may be done by using stitches with different numbers of phases on the different color planes, or by using the same number of phases but different pairs of patterns on each plane. The result will be color planes with reduced seam visibility, and with reduced color shift with misregistration.

Although the examples above involve repeating patterns of uniformly-sized phases, the present invention is not limited to use in conjunction with such patterns. Rather, embodiments of the present invention may, for example, be used with non-repeating patterns and/or with patterns having phases of non-uniform size.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or Field-Programmable Gate Arrays (FPGAs). A computer can generally also receive programs and data from a storage medium such as an internal disk or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A method for use in a multi-head printer to stitch a first and second region of a digital image, the method comprising steps of:
   (A) identifying a stitching region including adjoining portions of the first and second regions;
   (B) printing the adjoining portions of the first and second regions rising both a first and second print head in the multi-head printer by performing steps of:

(1) weighting the output of the first print head within the stitching region using a first weighting function; and
(2) weighting the output of the second print head within the stitching region using a second weighting function;

wherein neither the first weighting function nor the second weighting function is a step function.

2. The method of claim 1, wherein the first weighting function comprises a linear function having slope s and wherein the second weighting function comprises a linear function having slope −s.

3. The method of claim 1, wherein the multi-head printer comprises a variable-density printer.

4. The method of claim 1, wherein the multi-head printer comprises a variable-dot printer.

5. An apparatus for use in a multi-head printer to stitch a first and second region of a digital mace, the apparatus comprising:

means for identifying a stitching region including adjoining portions of the first and second regions;

means for printing the adjoining portions of the first and second regions using both a first and second print head in the multi-head printer, the means for printing comprising:

means for weighting the output of the first print head within the stitching region using a first weighting function; and means for weighting the output of the second print head within the stitching region using second weighting function;

wherein neither the first weighting function nor the second weighting function is a step function.

6. The method of claim 5, wherein the first weighting function comprises a linear function having slope s and wherein the second weighting function comprises a linear function having slope −s.

7. The method of claim 5, wherein the multi-head printer comprises a variable-density printer.

8. The method of claim 5, wherein the multi-head printer comprises a variable-dot printer.

* * * * *

UNITED STATES PATENT AND TRADEMARK OFFICE
CERTIFICATE OF CORRECTION

| | | |
|---|---|---|
| PATENT NO. | : 7,808,674 B2 | Page 1 of 1 |
| APPLICATION NO. | : 12/128507 | |
| DATED | : October 5, 2010 | |
| INVENTOR(S) | : Suhail S. Saquib and William T. Vetterling | |

It is certified that error appears in the above-identified patent and that said Letters Patent is hereby corrected as shown below:

In the claims:

Please replace column 12, line 66, Claim 1 with the following corrected version:

-- regions <u>using</u> ~~rising~~ both a first and second print head in the --

Please replace column 13, line 17, Claim 5 with the following corrected version:

-- first and second region of a digital <u>image</u> ~~mace~~, the apparatus com- --

Signed and Sealed this
Eighth Day of March, 2011

David J. Kappos
*Director of the United States Patent and Trademark Office*